(12) United States Patent
Just et al.

(10) Patent No.: US 8,302,311 B2
(45) Date of Patent: Nov. 6, 2012

(54) CONVERTIBLE TOP STACK HAVING A TRIPLE PIVOT FOR A PIVOT LINK, CENTER RAIL, AND REAR RAIL

(75) Inventors: Jan Just, Bloomfield Hills, MI (US); Thomas G. Fischer, Tubingen (DE)

(73) Assignee: Magna Car Top Systems GmbH, Rochester Hills, MI (US)

( * ) Notice: Subject to any disclaimer, the term of this patent is extended or adjusted under 35 U.S.C. 154(b) by 387 days.

(21) Appl. No.: 12/684,376

(22) Filed: Jan. 8, 2010

(65) Prior Publication Data
US 2010/0109375 A1 May 6, 2010

Related U.S. Application Data

(62) Division of application No. 10/598,382, filed as application No. PCT/US2005/006522 on Feb. 28, 2005, now Pat. No. 7,658,008.

(60) Provisional application No. 60/548,628, filed on Feb. 27, 2004.

(51) Int. Cl.
*B21D 53/88* (2006.01)

(52) U.S. Cl. ...... 29/897.2; 29/428; 29/897; 296/107.01; 296/107.08; 296/107.18

(58) Field of Classification Search ...... 29/897.2–897.3, 29/897, 428; 296/107.01, 108–109, 111, 296/114, 121, 122, 131
See application file for complete search history.

(56) References Cited

U.S. PATENT DOCUMENTS

| | | | |
|---|---|---|---|
| 4,720,133 A | 1/1988 | Alexander et al. | |
| 5,667,269 A | 9/1997 | Prenger et al. | |
| 5,829,821 A | 11/1998 | Aydt et al. | |
| 6,039,384 A * | 3/2000 | Schulte et al. | 296/146.2 |
| 6,041,752 A | 3/2000 | van Klompenburg | |
| 6,214,478 B1 | 4/2001 | Soell et al. | |

(Continued)

FOREIGN PATENT DOCUMENTS

EP 1149756 A2 10/2001

OTHER PUBLICATIONS

Thixomolding: Plastic Injection Molding Turns to Metal, The Thixomolding process offers magnesium castings with high strength and low wall thickness for the consumer electronics and automotive industries. XP-002991055, Stephen LeBeau, and Joseph Maffia, Fall 2002.

(Continued)

*Primary Examiner* — Richard Chang
(74) *Attorney, Agent, or Firm* — Brooks Kushman P.C.

(57) ABSTRACT

A convertible top stack linkage is provided that is formed, in part, in a thixotropic magnesium molding process. Many structural parts of the convertible top stack linkage may be thixotropically molded. A pivot link of the top stack linkage is pivotally connected to two bows, for example, the three and four bows of the top stack. A five bow extends between and is attached to right and left pivot links by right and left pressure links, respectively. A pivot link is provided that has a triple pivot connection to a tensioning link, a center rail and a rear rail. A main spring is secured to a pivot pin and connected to a main pivot bracket on the vehicle to provide a counterbalancing force on the balance link that assists in lifting the top stack linkage as the convertible top is retracted and extended.

3 Claims, 4 Drawing Sheets

U.S. PATENT DOCUMENTS

| | | |
|---|---|---|
| 6,513,407 B1 | 2/2003 | Higgins |
| 6,695,385 B1 | 2/2004 | Lange |
| 6,820,917 B2 | 11/2004 | Grubbs |
| 6,843,522 B2 | 1/2005 | Lange |
| 2001/0006302 A1 | 7/2001 | Nagayasu et al. |
| 2002/0189779 A1 | 12/2002 | Knott et al. |
| 2003/0090129 A1 | 5/2003 | Riley et al. |
| 2004/0003911 A1 | 1/2004 | Vining et al. |

OTHER PUBLICATIONS

European Patent Office, Supplementary Search Report for the corresponding European Patent Application No. 05724129.1—1268 mailed May 6, 2010.

\* cited by examiner

CONVERTIBLE TOP STACK HAVING A TRIPLE PIVOT FOR A PIVOT LINK, CENTER RAIL, AND REAR RAIL

CROSS-REFERENCE TO RELATED APPLICATIONS

This application is a division of U.S. application Ser. No. 10/598,382 filed Aug. 25, 2006, which claims priority to PCT Application PCT/US2005/006522 filed Feb. 28, 2005, which claims the benefit of U.S. provisional application Ser. No. 60/548,628 filed Feb. 27, 2004.

BACKGROUND OF THE INVENTION

1. Field of the Invention

The present invention relates to a convertible top stack having a pivot link supporting two bows that shares a common pivot point with a center rail and a rear rail.

2. Background Art

Convertible tops may be provided on vehicles to provide the option of converting a vehicle to an open top configuration. Convertible tops may be extended to cover a passenger compartment and may be retracted to provide an open passenger compartment. Convertible tops have a soft top cover that is supported by a top stack linkage in an extended position. The convertible top may be folded by the top stack linkage and stored in the storage compartment or in the portion of the trunk of the vehicle when it is in its retracted position.

Convertible tops generally comprise structural elements such as the top stack and a plurality of transversely extending bows that support a flexible top cover made of cloth generally having a canvas-like appearance. Convertible tops also generally include a backlight, or window. Convertible tops are relatively complex structures that require fabrication and assembly of many component parts. An objective of convertible top design is to minimize the number of component parts without sacrificing appearance or function.

Each pivot point of a convertible top must be carefully assembled from multiple components that are secured to a pivot pin. When all of the necessary components are assembled to a pivot pin with bushings and washers they are permanently secured with a flaring tool, snap ring fastener, or the like.

Number three and four bows of a convertible top normally require separate links that support and position these bows relative to different parts of the top stack linkage. Each additional link may increase part count and manufacturing expense required to produce the convertible top.

There is a need for a simplified convertible top structure that minimizes part count and reduces assembly operations necessary to build the convertible top.

These problems and needs are addressed by applicant's invention as summarized below.

SUMMARY OF THE INVENTION

According to the present invention, the method of making a top stack linkage for a convertible top for a vehicle is disclosed in which magnesium is molded in a thixotropic molding process to form at least a one bow, including a front rail portion, a plurality of side rails and a plurality of links. The front rail portion, side rails and links are assembled together with a plurality of bows to form the top stack linkage for the convertible top.

Other aspects of the invention as it relates to the method of making a top stack linkage comprise molding magnesium in a thixotropic molding process to form a plurality of end portions of a plurality of transversely extending bows. A plurality of central portions of each of the bows is provided, for example, by an extrusion process. The two end portions are each assembled to the central portions to form a complete bow.

According to another aspect of the method, the molding step may further include molding a plurality of fasteners bosses, reinforcing ribs and pivot pin retainers on the front rail portion, the plurality of side rails and the plurality of links. The molding step may also include molding a rear rail and pressure link that connects the rear rail to the top stack linkage. The side rails made according to the method may include a central rail and a rear rail. The links may include a scissor link, control link, pivot link and pressure link.

According to another aspect of the invention, a top stack linkage for a convertible top for a vehicle having a windshield header is provided. The top stack linkage comprises a one bow that is selectively secured to the windshield header and is integrally molded to include the right and left front rails. Right and left center rails are pivotally connected to the right and left front rails, respectively. Right and left rear rails are pivotally connected to the right and left center rails, respectively. Right and left pivot links are pivotally connected to the right and left center rails and the right and left rear rails on right and left triple pivot pins. Right and left control links are pivotally connected to the right and left front rails and to the right and left triple pivot pins, respectively. A two bow extends between and is attached to the right and left center rails. A three bow and a four bow extend between and are attached to the right and left pivot links.

According to other aspects of the invention relating to the structure of the top stack linkage, the top stack linkage may further comprise a five bow extending between and attached to the right and left pivot link by right and left pressure links, respectively. The top stack linkage may also further comprise right and left cylinders connected between right and left center rails and the right and left control links. The cylinders exert a biasing force on the control links to lift the one bow off of the windshield header when the top stack is initially retracted.

According to another aspect of the present invention, a convertible top for a vehicle having a passenger compartment is provided that includes a top stack linkage having a right side and a left side. A cover is secured to the top stack linkage and spans between the right and left side to enclose the passenger compartment of the vehicle. Right and left sides of the top stack linkage each have a pivot link that is pivotally connected to two different bows. Each pivot link is pivotally connected to one of the sides of the top stack linkage.

According to other aspects of the invention as they relate to the convertible top, the pivot link may be connected to a tensioning link that applies tension to a rear bow. The tensioning link may be connected to the pivot link at a location that is disposed rearward of the location where the pivot link is connected to the right and left top stack linkages. The pivot link may also be connected by a triple pivot to a center rail and a rear rail. The pivot link may also be pivotally connected to a control link at a location that is disposed forward of the triple pivot. The pivot link may also be pivotally connected to a control link. The two different bows may each be secured to the cover at spaced locations.

According to another aspect of the present invention, a convertible top for a vehicle having a passenger compartment is provided that includes a main spring that assists in lifting the top stack linkage as the convertible top is retracted and extended. The convertible top includes a top stack linkage that has a right side and a left side. A cover is secured to the top stack linkage and spans between the right side and the left side to enclose the passenger compartment of the vehicle. The right and left sides of the top stack linkage each have a main spring secured to a pivot pin that is connected to a main pivot bracket. A rear rail is connected to the main pivot bracket on a lower end and to the other parts of the top stack linkage on its upper end. A balance link is secured to the pivot pin on its lower end and to a center link on its upper end. The main spring provides counterbalancing force on the balance link for assisting in lifting the top stack linkage.

According to other aspects of the invention as they relate to the convertible top, the main spring may have a forked end that engages the balance link. The right and left sides of the top stack linkage may each further comprise a cylinder connected between the center rail and a control link wherein the cylinder exerts a biasing force on the control link to lift a front portion of the top stack linkage as the convertible top is retracted.

The above-described aspects of the present invention and other features and advantages will be better understood in view of the attached drawings and following detailed description of the illustrated embodiment of the invention.

DETAILED DESCRIPTION OF THE PREFERRED EMBODIMENT(S)

Figure 1:
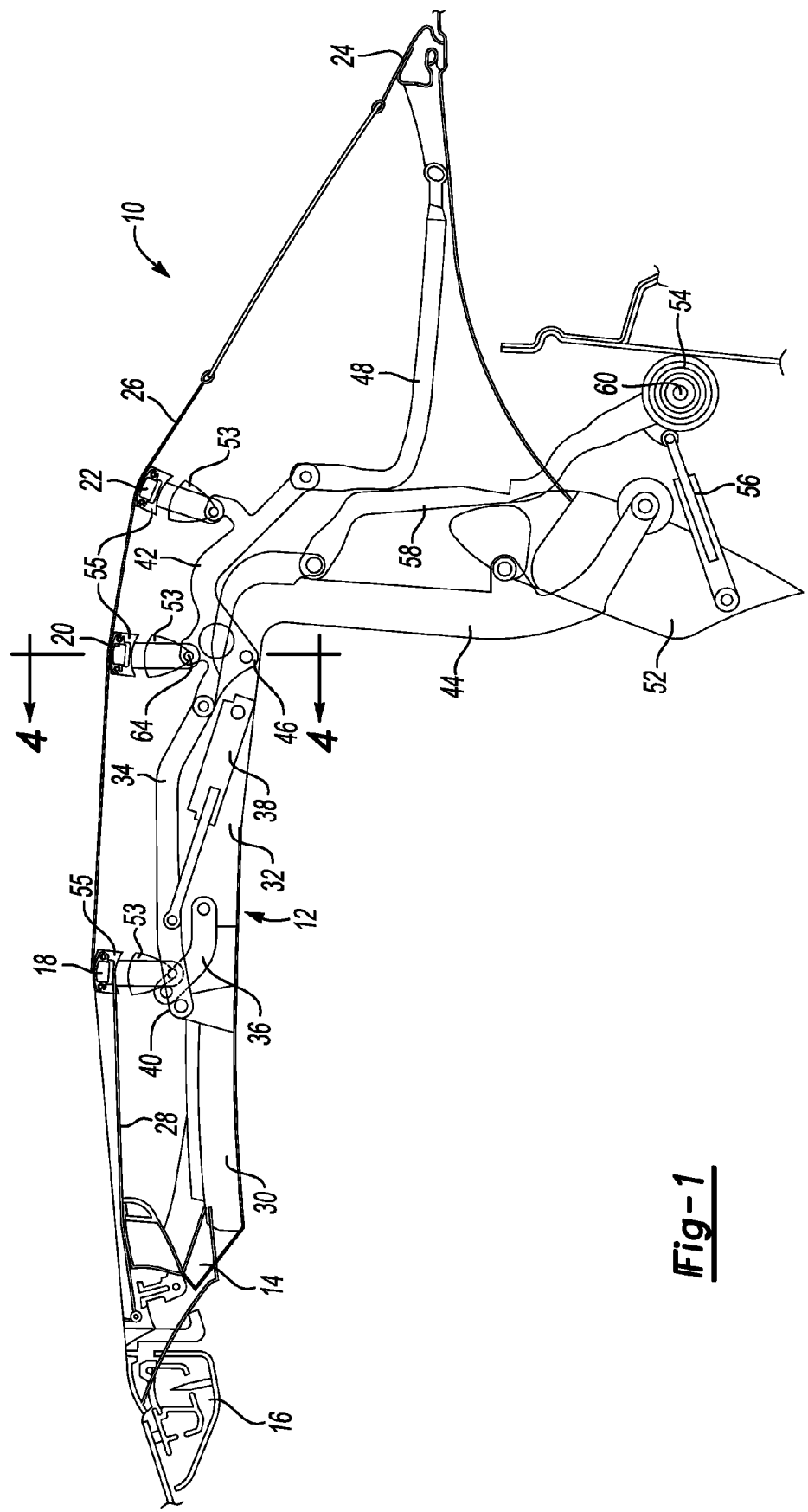
FIG. 1 is a side elevation view of a convertible top and top stack linkage made according to the present invention.

Referring to FIG. 1, a convertible top 10 is illustrated including a top stack 12. The convertible top includes a one bow 14 that is adapted to be secured a windshield header 16. Moving rearwardly from the one bow, the other bows of the top stack 12 are identified as a two bow 18, a three bow 20, a four bow 22, and a five bow 24. The bows support the top cover 26 when the convertible top 10 is in its extended, or passenger compartment covering, position. A headliner 28 extends from the one bow 14 to the four bow 22 and is secured to each of the bows except for the five bow 24.

The one bow is integrally formed with a front rail portion 30. The front rail portion 30 of the one bow 14 is connected on its rearward end to a center rail 32 and control link 34.

The two bow 18 is connected to a scissor link 36. An upper cylinder 38 is connected to the center rail 32 and scissor link 36 on opposite ends. When it is desired to retract the convertible top 10, the upper cylinder 38 retracts causing the scissor link 36 to rotate in a clockwise direction as shown in FIG. 1. The scissor link 36 lifts the control link 34 that in turn lifts the front rail portion 30 and one bow 14 off of the windshield header 16. The connection between scissor link 36 and the two bow 18 includes a slot 40 that permits a limited degree of lost motion connection between the scissor link and the two bow 18.

The center rail 32 is connected on its rearward end to a pivot link 42 and a rear rail 44 on a triple pivot pin 46. Pivot link 42 is also connected to the control link 34. Pivot link 42 is pivotally connected to each of the three bow 20 and four bow 22. The rearward end of the pivot link 42 is connected to the pressure link 48. Pressure link 48 interconnects the pivot link 42 with the five bow 24. As the pivot link 42 is rotated during the retraction cycle, the pressure link 48 lifts the five bow 24. At the same time, the pivot link 42 moves the three bow 20 and four bow 22 rearwardly.

The rear rail 44 is connected on its forward end to the center rail 32 and is attached to the five bow at an intermediate point on its lower portion. The rear rail 44 is also pivoted on its lower end to the main pivot bracket 52.

A main spring 54 is supported on the main pivot bracket 52. The main spring 54 is a power spring used to counterbalance the weight of the convertible top 10 during its extension and retraction cycles. A lower cylinder 56 is also provided as part of the main pivot bracket assembly 52. A balance link 58 is connected to the main pivot bracket assembly 22 and the main spring 54 on its lower end. The upper end of the balance link 58 is connected on its upper end to the center rail 32.

As the top is retracted, the rear rail 44 rotates in a clockwise direction, as viewed in FIG. 1, about the main pivot bracket 52. The balance link 58 also rotates in a clockwise direction about the main pivot bracket 52 thereby causing the center rail 32 to rotate upwardly and rearwardly in a generally clockwise direction. As the retraction cycle continues, the one bow 14 rotates over the center rail 32 and the three and four bows rotate rearwardly toward the five bow 24. Ultimately, the retraction cycle is completed with the bows stacked in the storage compartment located behind the main pivot bracket 52.

Figure 2:
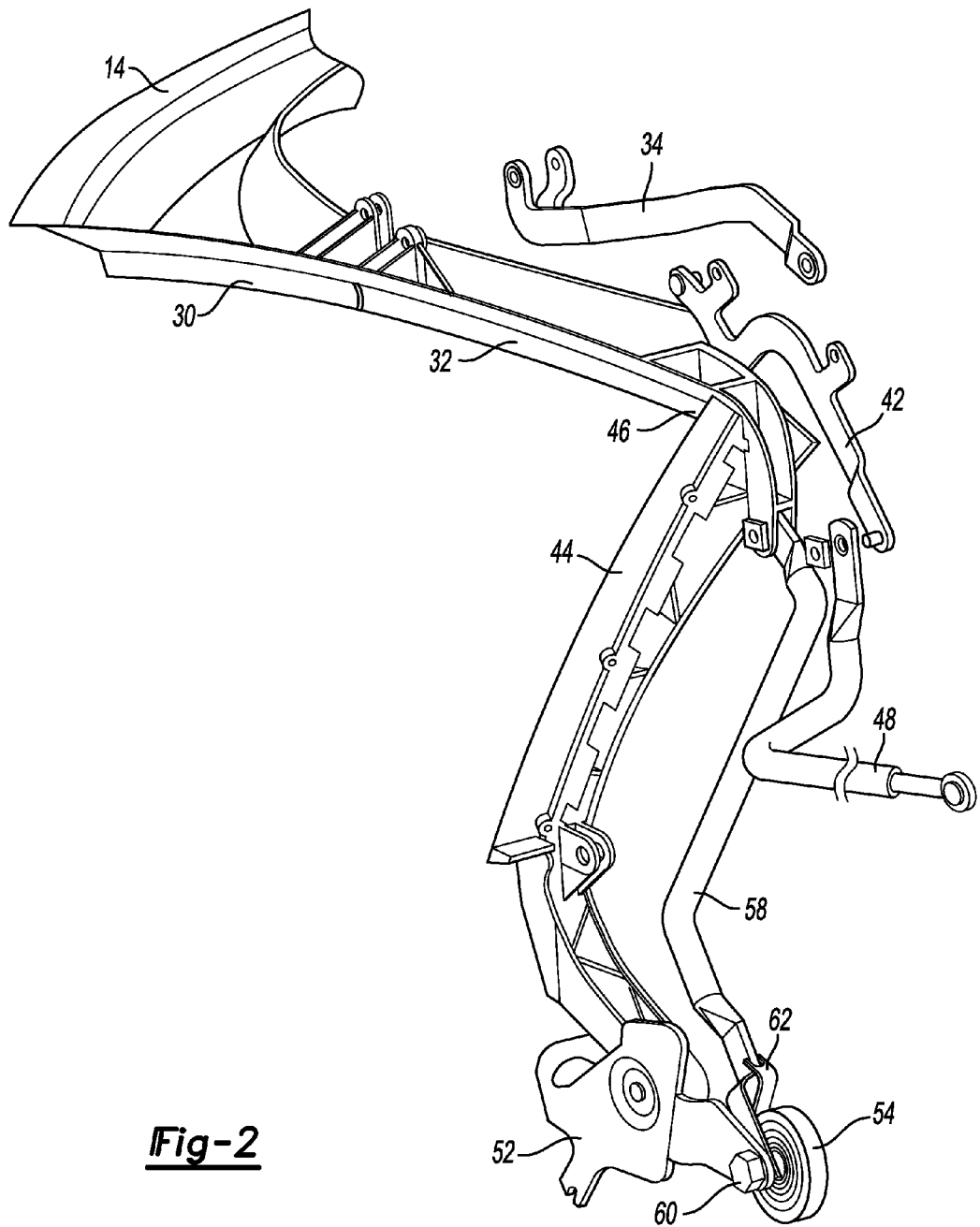
FIG. 2 is a fragmentary, partially exploded perspective view of a top stack linkage made according to the present invention.

Referring to FIG. 2, the control link 34 is shown removed from the pivot point that connects the control link 34 to the front rail portion 30 of the one bow 14 on its front end. The control link 34 is also shown exploded from its pivot point with the pivot link 42. Pivot link 42 is shown connected to the center rail 32 and rear rail 44 at an intermediate point on the pivot link 42. The rear end of the pivot link 42 is shown connected to the pressure link 48. The connection between the main pivot bracket assembly 52, rear rail 44, and balance link 58 are also illustrated. The main spring 54 exerts a counterbalancing force on the balance link 58 throughout the retraction and extension cycles.

Figure 3:
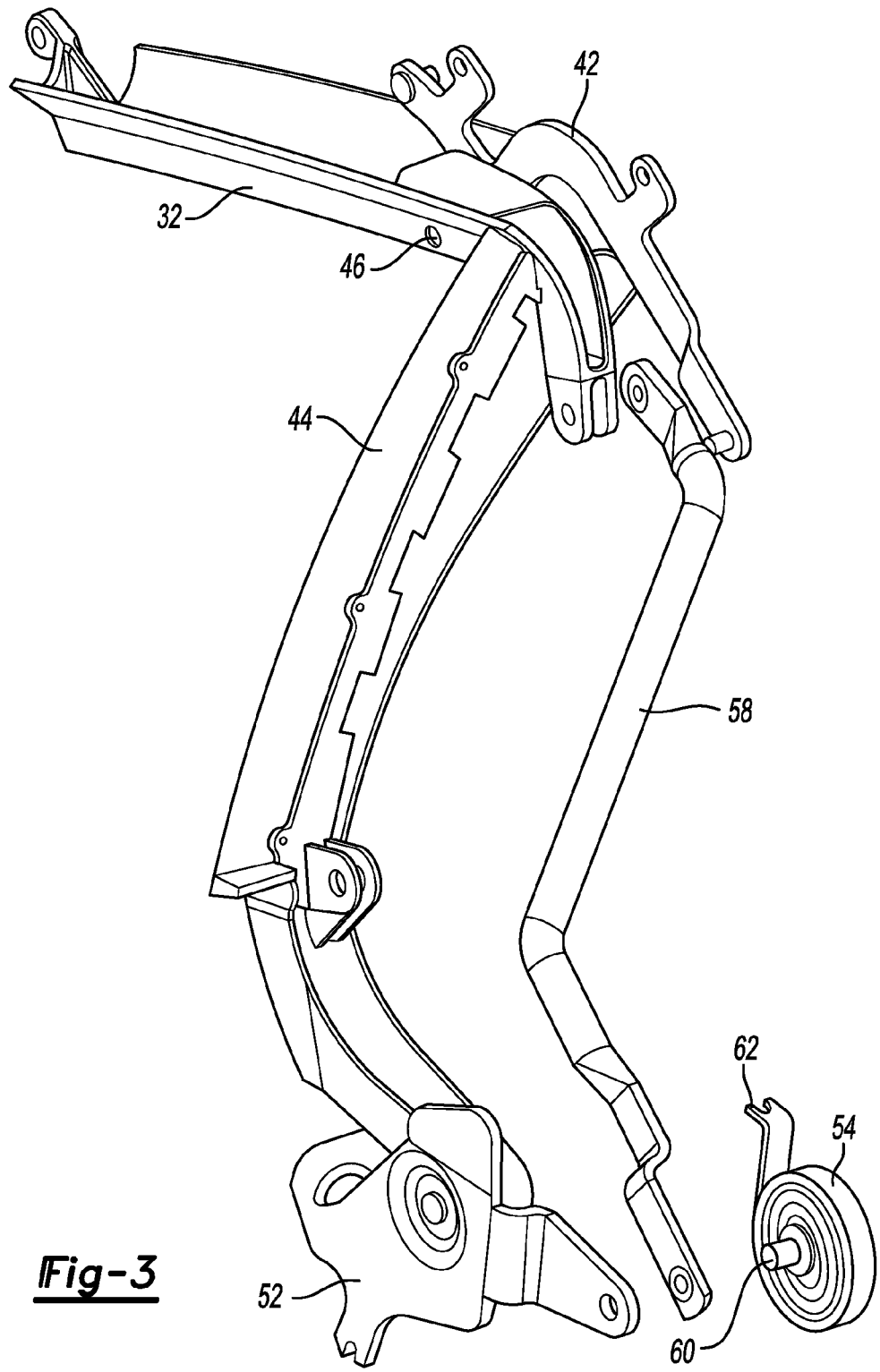
FIG. 3 is a perspective view of a portion of a top stack linkage made according to the present invention.

Referring to FIG. 3, the connections between balance link 58, main spring 54, and main pivot bracket 52 may be seen in greater detail. The main pivot bracket 52 is connected to the rear rail 44 at the lower end of the rear rail 44. The balance link is pivoted on a spring mount pivot pin 60 to which the main spring 54 is also mounted. A forked end 62 of the main spring 54 engages the balance link 58 at a point radially spaced from pivot pin 60. The main spring 54 exerts a force on the balance link 58 that assists in lifting the convertible top 10 through the center rail 32 and one bow 14.

Figure 4:
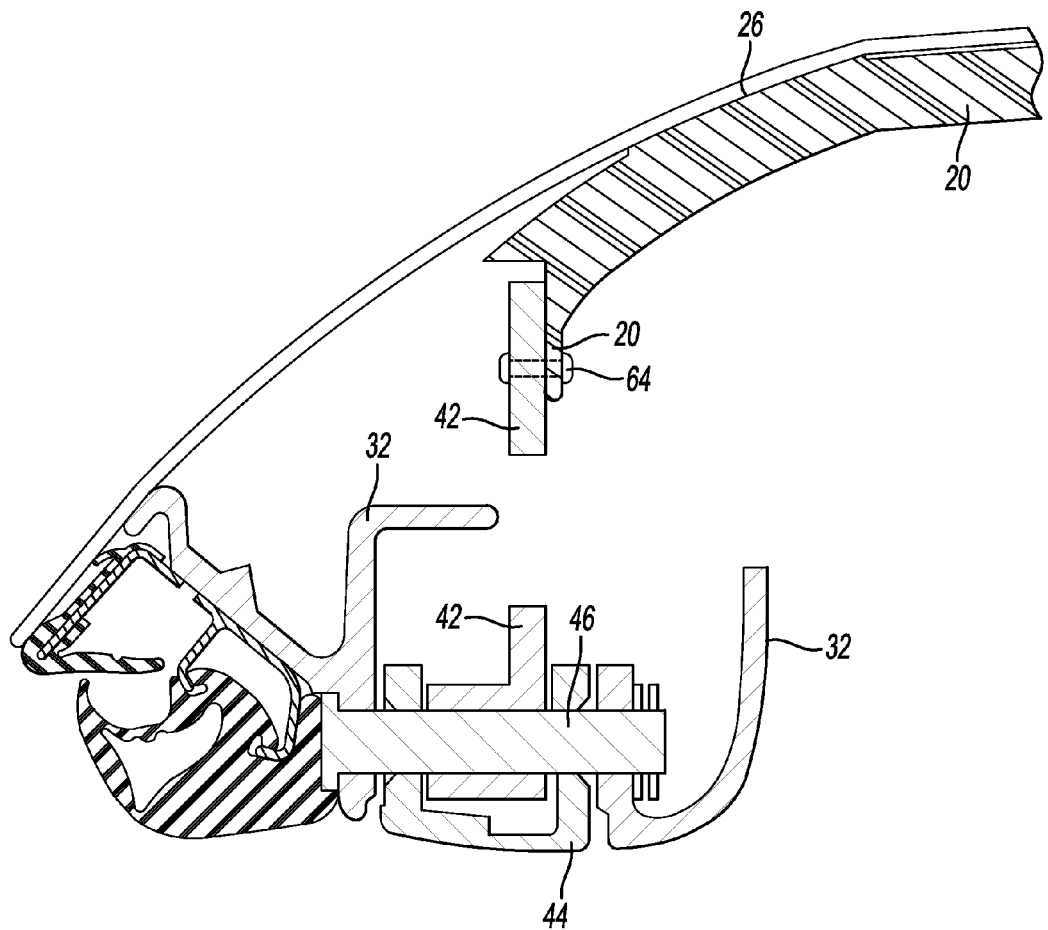
FIG. 4 is a cross-sectional view taken along the line 4-4 in FIG. 1.

Referring to FIG. 4, the triple pivot pin 46 is shown in cross section. The triple pivot pin 46 is journaled by the center rail 32 on opposite ends of the pin 46. The pivot link 42 is also assembled to the center portion of the triple pivot pin 46. The rear rail 44 is secured to the pin 46 between the pivot link 42 and outer ends of the pin 46 where the pin 46 is connected to the center rail 32.

FIG. 4 also illustrates the relationship of the three bow 20 and top cover 26 relative to the center rail 32. The three bow 20 is connected on pivot pin 64 to the pivot link 42.

Several parts of the top stack 12, and also the handle hardware and latch mechanisms can be formed advantageously with a Thixomolding® process in which Magnesium is heated to its thixotropic state and injection molded to form the parts to net size and shape. The Thixomolding® process allows fastener bosses, reinforcing ribs, class A surfaces and pivot pin retainers to be formed without additional machining operations. In particular, the one bow 14 including the front rail portion 30, center rail 32, scissor link 36, control link 34, scissor link 36, pivot link 42, rear rail 44, pressure link 48, and end portions of the two through four bows 18, 20 and 22 may all be fabricated using the Thixomolding® process.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A top stack linkage for a convertible top for a vehicle having a windshield header, the top stack linkage comprising:
 a one bow that is selectively secured to the windshield header, the one bow being integrally molded to include right and left front rails;
 right and left center rails pivotally connected to the right and left front rails, respectively;
 right and left rear rails pivotally connected to the right and left center rails, respectively;
 right and left pivot links pivotally connected to the right and left center rails and the right and left rear rails on right and left triple pivot pins;
 right and left control links pivotally connected to the right and left front rails and to the right and left triple pivot pins, respectively;
 a two bow extends between and is attached to the right and left center rails, and a three bow and a four bow extends between and are attached to the right and left pivot links.

2. The top stack linkage of claim 1 further comprising a five bow extending between and attached to the right and left pivot links by right and left pressure links, respectively.

3. The top stack linkage of claim 1 further comprising right and left cylinders connected between the right and left center rails and the right and left control links, wherein the cylinders exert a biasing force on the control links to lift the one bow off of the windshield header when the top stack is initially retracted.

* * * * *